(12) United States Patent
Sato et al.

(10) Patent No.: US 6,969,550 B2
(45) Date of Patent: Nov. 29, 2005

(54) MAGNETIC RECORDING MEDIUM

(75) Inventors: Tomoe Sato, Kanagawa (JP); Tetsuo Samoto, Miyagi (JP); Shinya Yoshida, Miyagi (JP); Hitoshi Wako, Miyagi (JP); Takashi Kanou, Miyagi (JP); Naoki Ikeda, Miyagi (JP); Kazuhiko Suzuki, Miyagi (JP); Seiichi Onodera, Miyagi (JP)

(73) Assignee: Sony Corporation, Tokyo (JP)

( * ) Notice: Subject to any disclaimer, the term of this patent is extended or adjusted under 35 U.S.C. 154(b) by 54 days.

(21) Appl. No.: 10/418,333

(22) Filed: Apr. 18, 2003

(65) Prior Publication Data

US 2004/0023070 A1 Feb. 5, 2004

(30) Foreign Application Priority Data

Apr. 25, 2002 (JP) ........................ 2002-124367

(51) Int. Cl.⁷ .............................. G11B 5/725
(52) U.S. Cl. ................. 428/219; 428/421; 428/694 TP; 428/694 TF
(58) Field of Search .................. 428/694 TP, 694 TF, 428/219, 421

(56) References Cited

U.S. PATENT DOCUMENTS 4,735,848 A * 4/1988 Kondo et al. ............... 428/219
5,188,747 A * 2/1993 Kai et al. .................... 508/482
5,492,764 A * 2/1996 Okita et al. .................. 428/457
5,578,387 A * 11/1996 Kai et al. ................. 428/694 T

FOREIGN PATENT DOCUMENTS

JP 07-133253 * 5/1995
JP 2001-216662 * 8/2001

* cited by examiner

*Primary Examiner*—Stevan A. Resan

(57) ABSTRACT

There is provided a magnetic recording medium which exhibits superior lubricating properties and superior tape-transport properties as well as superior robustness even in a low-temperature environment. A magnetic layer containing a ferromagnetic metal is formed on a nonmagnetic support, and a protecting film is formed on the magnetic layer. A lubricant auxiliary coating composition comprising an aromatic alcohol is applied to the protecting film to form a lubricant auxiliary layer, and a lubricant coating composition comprising a compound represented by the formula (1) below is applied to the lubricant auxiliary layer to form a lubricant layer.

$$R^1CH(COOR^2)CH_2COOR^3 \qquad (1)$$

wherein $R^1$ represents an aliphatic alkyl group, an aliphatic alkenyl group, or a hydrogen atom, and each of $R^2$ and $R^3$ independently represents a fluoroalkyl group, a fluoroalkenyl group, a fluoropolyether group, or a hydrogen atom.

2 Claims, 1 Drawing Sheet

MAGNETIC RECORDING MEDIUM

CROSS REFERENCES TO RELATED APPLICATIONS

The present invention claims priority to its priority document No. 2002-124367 filed in the Japanese Patent Office on Apr. 25, 2002, the entire contents of which being incorporated by reference herein.

BACKGROUND OF THE INVENTION

1. Field of the Invention

The present invention relates to a magnetic recording medium in which a magnetic metal thin film is formed on a nonmagnetic support as a magnetic layer.

2. Description of Related Art

Conventionally, as magnetic recording media, so-called coating type magnetic recording media have been widely used wherein the magnetic layer in the recording media is formed by applying to a nonmagnetic support a magnetic coating composition which consists of ferromagnetic powder, such as oxide magnetic powder or alloy magnetic powder, a binder, and an organic solvent.

On the other hand, there are increasing demands of recording at a higher density for a prolonged time, and, for meeting the demands, so-called ferromagnetic metal thin film type magnetic recording media are being used wherein the magnetic layer is formed by depositing a magnetic material containing a ferromagnetic metal directly onto a nonmagnetic support, such as a polyester film or a polyamide film, by, for example, a vacuum thin film forming technique, such as a vacuum deposition process, a sputtering process, or an ion plating process, or electroplating.

As a magnetic recording medium for meeting the demands of higher density recording, Japanese Patent Application Laid-Open Specification No. 11-203652 discloses a ferromagnetic metal thin film type magnetic recording medium having a magnetic layer which is optimized for reproduction with a helical scanning system using a magnetoresistance effect type replaying head (hereinafter, frequently referred to simply as "MR head") having high sensitivity.

Generally, in a magnetic recording and replaying apparatus with a helical scanning system, a magnetic recording medium is always in contact with a magnetic head while traveling at a high speed. Therefore, the magnetic recording medium is very likely to suffer wearing or damage due to contact with the magnetic head. For solving this problem, in the ferromagnetic metal thin film type magnetic recording medium, a protecting film layer containing carbon or a lubricant layer is formed on the magnetic layer to improve the motion properties and robustness.

However, the magnetic head wears of f the protecting film or lubricant that is formed for realizing superior tape-transport properties and robustness during its movement, so that abrasion of the protecting film or lubricant, i.e. so-called generation of powder debris may occur. If such powder debris is accumulated, spacing between the magnetic recording medium and the magnetic head may be widened, thereby leading to a problem in that a predetermined signal output cannot be obtained. In addition, a problem is also encountered in that portions of the magnetic recording medium in which the protecting film or lubricant is worn of f become in contact with the magnetic head and wear off the magnetic head.

In recent years, for lowering the spacing loss and improving electromagnetic conversion characteristics, the ferromagnetic metal thin film type magnetic recording medium is improved in surface smoothness by a surface smoothing treatment, such as a supercalendering treatment. However, when the surface smoothness of the magnetic layer is extremely superior, the substantial contact area of the magnetic layer with the magnetic head becomes large, so that the coefficient of friction of the magnetic layer relative to the magnetic head tends to become much larger. Further, in accordance with an increase in the recording time, a period of time for rubbing the recording medium against the magnetic head is prolonged, and the scanning speed tends to be increased, thus promoting the generation of powder debris. Especially during the replaying operation in a still mode in which the same portion of a medium is continuously scanned repeatedly, the lubricant layer is difficult to recover by itself, and a load on each of the medium and the head is large, so that a dropout problem in that the output is suddenly lowered during the replay is likely to occur.

For example, Japanese Patent Application Laid-Open Specification No. 11-203652 discloses a magnetic recording medium which includes a magnetic layer optimized for the properties of the MR head used, and which uses, e.g., perfluoropolyether as a lubricant to exhibit superior lubricating effect under any conditions for use. However, when using perfluoropolyether as a lubricant, the generation of powder debris cannot be satisfactorily prevented, thus causing dropout of the output during replay or causing the head to wear down. Further, generally used perfluoropolyether having, for example, a hydroxyl group or a carboxyl group as a terminal group is difficult to be dissolved in an alcohol solvent or a hydrocarbon solvent, and therefore a fluorine solvent is inevitably used for dissolving the lubricant, leading to problems of in view of the preservation of the environment and productivity.

For resolving the problems, in the field of magnetic recording, typically, for preventing the protecting film from wearing off and removing the powder debris of the protecting film or lubricant, which is generated and deposited on the magnetic head, a method in which the hardness of the protecting film layer is increased so as to become physically abrasive to the magnetic head is used. However, when the hardness of the protecting film layer is increased, the protecting film layer may become too abrasive and wear off the magnetic head than it is necessary, thereby lowering the properties of the magnetic head.

SUMMARY OF THE INVENTION

For resolving above described problems, Japanese Patent Application Nos. 2000-275399 and 2000-275399 provide a magnetic recording medium which uses a fluorine-containing monocarboxylic acid monoester or a fluorine-containing diester as a lubricant to prevent the generation of powder debris and to suppress wearing off of a head. However, when using a fluorine-containing monocarboxylic acid monoester or a fluorine-containing diester as a lubricant, the lubricant film is likely to suffer breakage during the still image replay in a low-temperature environment, so that the output may be lowered due to the breakage of the magnetic film.

The present invention has been conceived in view of the above-mentioned problems accompanying the conventional technique. It is desirable to provide a magnetic recording medium which is advantageous not only in that it exhibits superior motion properties and superior robustness in a low-temperature environment, but also in that it prevents the head from wearing off and deterioration of its magnetic properties.

In one aspect of the present invention, there is provided a magnetic recording medium which includes a nonmagnetic support, a magnetic layer containing a ferromagnetic metal material, and a protecting film. The magnetic layer and the protecting film are successively formed on the nonmagnetic support. The magnetic recording layer further include a lubricant auxiliary layer containing aromatic alcohol, which is formed on the protecting film.

According to the one aspect of the magnetic recording medium, by virtue of having the lubricant auxiliary layer containing an aromatic alcohol, the lubricant film formed as the uppermost layer via the lubricant auxiliary layer may be improved in the ability to recover by itself, so that the lubricant film can be prevented from suffering breakage in a low-temperature environment and the tape-transport properties and robustness of the magnetic recording medium can be improved.

In another aspect of the present invention, a lubricant layer containing a compound represented by the following formula (1) is formed on the lubricant auxiliary layer of the magnetic recording medium described above:

$$R^1CH(COOR^2)CH_2COOR^3 \qquad (1)$$

wherein $R^1$ represents an aliphatic alkyl group, an aliphatic alkenyl group, or a hydrogen atom, and each of $R^2$ and $R^3$ independently represents a fluoroalkyl group, a fluoroalkenyl group, a fluoropolyether group, or a hydrogen atom.

According to the another aspect of the magnetic recording medium, by using the compound represented by formula (1) as a lubricant, the lubricant layer, which maintains the lubricating effect over a long term and which suppresses the generation of powder debris, may be formed. Accordingly, the magnetic recording medium not only can exhibit superior tape-transport properties and superior robustness but also can prevent the head from wearing off and deterioration of its magnetic properties. In addition, if the lubricant layer is formed on the lubricant auxiliary layer containing aromatic alcohol, the lubricant layer may be prevented from suffering breakage in a low-temperature environment, the superior still robustness may be maintained in a low-temperature environment, and the generation of powder debris may be prevented.

According to still another aspect of the present invention, there is provided a magnetic recording medium that includes a nonmagnetic support, a magnetic layer containing a ferromagnetic metal material, and a protecting film. The magnetic layer and the protecting film are successively formed on the nonmagnetic support. Furthermore, the magnetic recording medium has a lubricant layer containing aromatic alcohol and a compound represented by the formula (1) above, the lubricant layer being formed on the protecting film.

According to the still another aspect of the magnetic recording medium, by using the lubricant containing a compound represented by formula (1), the lubricant layer which maintains the lubricating effect over a long term and which suppresses the generation of powder debris is formed. Accordingly, the magnetic recording medium not only can exhibit superior tape-transport properties and superior robustness but also can prevent the head from wearing off and deterioration of its magnetic properties. In addition, by using the lubricant auxiliary comprising an aromatic alcohol, the lubricant molecules are prevented from undergoing crystallization and hence the lubricant film is softened, so that the lubricant film which suffers breakage rapidly recovers, thus enabling the magnetic recording medium to maintain superior still robustness in a low-temperature environment and prevent the generation of powder debris.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Hereinbelow, preferred embodiments of the present invention will be described with reference to the accompanying drawings.

First Embodiment

Figure 1:
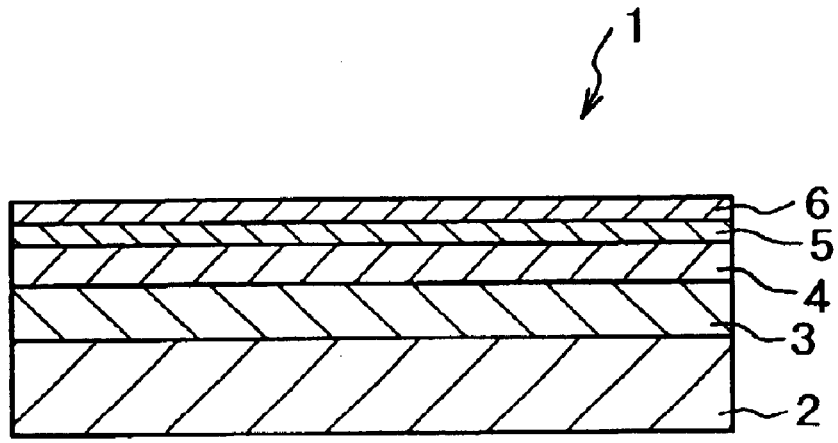
FIG. 1 is a diagrammatic cross-sectional view of a magnetic recording medium according to the first embodiment of the present invention.

FIG. 1 shows a magnetic recording medium 1 according to the first embodiment of the present invention wherein a magnetic metal thin film containing a ferromagnetic metal material is formed as a magnetic layer 3 on one primary surface of a nonmagnetic support 2, a protecting film 4 is formed on the magnetic layer 3, and a lubricant auxiliary layer 5 and a lubricant layer 6 constituting the uppermost layer are formed on the protecting film 4.

As a material for the nonmagnetic support 2, any materials usable as a nonmagnetic support in general magnetic recording media can be used, and specific examples include polyester, such as polyethylene terephthalate and polyethylene naphthalate; polyolefin, such as polyethylene and polypropylene; cellulose derivatives, such as cellulose triacetate and cellulose diacetate; vinyl resins, such as polyvinyl chloride and polyvinylidene chloride; plastics, such as polycarbonate, polyimide, polyamide, and polyamideimide; light metals, such as aluminum alloys and titanium alloys; and ceramic, such as glass.

If rigid material, such as an aluminum alloy plate or a glass plate, is used as the nonmagnetic support 2, the surface of the nonmagnetic support 2 may be subjected to anodized aluminum treatment and an oxide film or a Ni—P film may be formed on the surface treated so that the surface of the nonmagnetic support 2 has stiffness. The nonmagnetic support 2 may have any forms of a film, a sheet, a disc, a card, and a drum.

The nonmagnetic support 2 may have formed on its surface at least one type of protrusions selected from the pointed protrusions, the wrinkle protrusions, and granular protrusions so as to control the surface roughness. By forming on the nonmagnetic support 2 with at least one type of protrusions selected from the pointed protrusions, the wrinkle protrusions, and the granular protrusions, the surface characteristics of the magnetic layer 3 can be controlled, and when forming two or more types of these protrusions in combination, the effect is increased. Especially when the wrinkle protrusions and the granular protrusions are formed on the nonmagnetic support 2 having formed thereon the pointed protrusions, the robustness and the tape-transport properties of the magnetic recording medium are remarkably improved. In this case, it is preferred that the protrusions collectively have a height in the range of from 10 to 200 nm and a density of $1 \times 10^5$ to $1 \times 10^7$ particles/mm$^2$.

The pointed protrusions are formed by incorporating inorganic fine particles having a particle diameter of about 50 to 300 nm into the nonmagnetic support 2 upon forming the nonmagnetic support 2. It is preferred that the pointed protrusions have a height from the nonmagnetic support 2 of 10 to 100 nm and a density of about $1 \times 10^4$ to $1 \times 10^5$ particles/mm$^2$. As inorganic fine particles incorporated into the nonmagnetic support 2 to form the pointed protrusions, calcium carbonate, silica, and alumina are preferred.

The wrinkle protrusions are formed by applying a dilute solution of a resin using a specific mixed solvent to the nonmagnetic support 2 and drying the solution applied. The wrinkle protrusions preferably have a height of 0.01 to 1 $\mu$m, more preferably 0.03 to 0.5 $\mu$m. It is preferred that the wrinkle protrusions have a shortest interval of 0.1 to 20 $\mu$m.

As a resin used for forming the wrinkle protrusions, single resins, mixtures, and copolymers of polyester, such as polyethylene terephthalate and polyethylene naphthalate; polyamide; polystyrol; polycarbonate; polyacrylate; polysulfone; polyvinyl chloride; polyvinylidene chloride; polyvinyl btyral; polyphenylene oxide; and a phenoxy resin can be used, and ones having a solvent in which they are soluble are suitable. A thin layer having very finely the wrinkle protrusions can be formed by applying to the surface of the nonmagnetic support 2 a solution obtained by adding to a solution, which is prepared by dissolving the above resin in a good solvent of the resin so that the resin concentration becomes 1 to 1,000 ppm, a poor solvent of the resin having a boiling point higher than that of the above good solvent in an amount 10 to 100 times the amount of the resin, and then drying the solution applied.

The granular protrusions are formed by depositing organic ultrafine particles of, e.g., an acrylic resin or inorganic fine particles of, e.g., silica or metal powder onto the nonmagnetic support 2 so that the particles deposited have a spherical form or a hemispherical form. It is preferred that the granular protrusions have a height of 5 to 50 nm and a density of $1 \times 10^6$ to $5 \times 10^7$ particles/mm$^2$.

The magnetic layer 3 is formed by depositing a ferromagnetic metal material directly onto the nonmagnetic support 2 by a so-called physical vapor deposition (hereinafter, frequently referred to simply as "PVD") process, such as an electroplating process, a sputtering process, or a vacuum deposition process. That is, the magnetic layer 3 is a magnetic metal thin film containing a ferromagnetic metal material. It is preferred that the magnetic layer 3 formed by the above process has a thickness of 0.01 to 1 $\mu$m.

As a ferromagnetic metal material constituting the magnetic layer 3, for example, a metal, such as Fe, Co, or Ni, a Co—Ni alloy, a Co—Pt alloy, a Co—Pt—Ni alloy, an Fe—Co alloy, an Fe—Ni alloy, an Fe—Co—Ni alloy, an Fe—Ni—B alloy, an Fe—Co—B alloy, an Fe—Co—Ni—B alloy, a Co—Cr alloy, or the above metal or alloy containing a metal, such as Pt or Al, may be used.

Examples of the magnetic metal thin films include in-plane magnetized films and perpendicularly magnetized films, and, especially when using a Co—Cr alloy, a perpendicularly magnetized film is formed. When forming an in-plane magnetized film as the magnetic layer 3, it is preferred that an undercoat layer containing a low melting-point nonmagnetic metal, such as Bi, Sb, Pb, Sn, Ga, In, Ge, Si, or Tl, is preliminarily formed on the nonmagnetic support 2. When the low melting-point nonmagnetic metal is diffused upon forming the magnetic metal thin film by vapor deposition or sputtering of the above metallic, magnetic material in the direction perpendicular to the nonmagnetic support 2, the orientation of the magnetic metal thin film is cancelled, so that the in-plane isotropy can be secured and the coercive properties are improved.

The protecting film 4 is formed by depositing, for example, carbon onto the magnetic layer 3 by, e.g., a chemical vapor deposition (hereinafter, frequently referred to simply as "CVD") process. The protecting film 4 preferably has a thickness of 2 to 50 nm, more preferably 5 to 30 nm. When the thickness of the protecting film 4 is less than 2 nm, the robustness of the protecting film 4 may be unsatisfactory. On the other hand, when the thickness of the protecting film 4 exceeds 50 nm, a satisfactory output may not be obtained in recording using a short wavelength.

The lubricant auxiliary layer 5 is formed by applying a solution obtained by dissolving an aromatic alcohol as a lubricant auxiliary in a solvent. The amount of the lubricant auxiliary in the lubricant auxiliary layer 5 is desirably 5 to 150 mg per 1 m$^2$, more preferably 10 to 50 mg per 1 m$^2$. When the amount of the lubricant auxiliary is less than 5 mg per 1 m$^2$, the lubricant auxiliary layer cannot satisfactorily recover the lubricant film, so that the still robustness in a low-temperature environment may be unsatisfactory. On the other hand, when the amount of the lubricant auxiliary is more than 150 mg per 1 m$^2$, the lubricant auxiliary may inhibit the lubricant from properly functioning.

The lubricant layer 6 is formed by applying to the lubricant auxiliary layer 5 a lubricant coating composition obtained by dissolving a lubricant comprising a compound represented by the structure formula (1) above in a solvent. The lubricant comprising a compound represented by structural formula (1) not only maintains the lubricating effect over a long term but also prevents the generation of powder debris.

In the compound represented by structural formula (1), the aliphatic alkyl group or aliphatic alkenyl group represented by $R^1$ preferably has 6 to 30 carbon atoms, more preferably 10 to 21 carbon atoms. When the aliphatic alkyl group or aliphatic alkenyl group represented by $R^1$ has 6 to 30 carbon atoms, the compound has superior solubility in a solvent, so that the effects of lowering the coefficient of friction and improving the wearing properties and the robustness are surely obtained. When the aliphatic alkyl group or aliphatic alkenyl group represented by $R^1$ has less than 6 carbon atoms, the length of the alkyl group is too short, so that the effects of lowering the coefficient of friction and improving the wearing properties and the robustness may not be obtained. On the other hand, when the aliphatic alkyl group or aliphatic alkenyl group represented by $R^1$ has more then 30 carbon atoms, the solubility of the compound in a solvent is too small, so that a uniform lubricant layer 5 may be difficult to form.

Further, in the compound represented by structural formula (1), with respect to the carbon atom number of each of the fluoroalkyl group, fluoroalkenyl group, and fluoropolyether group represented by $R^2$ and $R^3$, the fluoroalkyl group and the fluoroalkenyl group preferably have 6 to 30 carbon atoms, more preferably 6 to 21 carbon atoms, and the fluoropolyether group preferably has an average molecular weight of 1,000 to 6,000, more preferably 2,000 to 4,000. When the fluoroalkyl group or fluoroalkenyl group represented by $R^2$ and $R^3$ has 6 to 30 carbon atoms, the compound has superior solubility in a solvent, so that the effects of lowering the coefficient of friction and improving the wearing properties and the robustness are surely obtained. When the fluoroalkyl group or fluoroalkenyl group represented by $R^2$ and $R^3$ has less than 6 carbon atoms, the length of the alkyl group is too short, so that the effects of lowering the wearing properties and improving the wearing properties and the robustness may not be obtained. On the other hand, when the fluoroalkyl group or fluoroalkenyl group represented by $R^2$ and $R^3$ has more than 30 carbon atoms, the solubility of the compound in a solvent is too small, so that a uniform lubricant layer 5 may be difficult to form. When the fluoropolyether group represented by $R^2$ and $R^3$ has an average molecular weight of less than 1,000, the lubricant is likely to be peeled off, so that the wearing properties or robustness may not be improved. On the other hand, when the fluoropolyether group has an average molecular weight of more than 6,000, the lubricant layer is likely to stick to a head due to cohesion, lowering the wearing properties.

The lubricant layer 6 may include a compound represented by structural formula (1) and a conventionally known lubricant in combination. The coating weight of the lubricant coating composition is preferably 5 to 500 mg/m$^2$, more preferably 10 to 150 mg/m$^2$. When the coating weight of the lubricant coating composition is too small, the effects of lowering the coefficient of friction and improving the wear resistance and the robustness may not be satisfactorily obtained. On the other hand, when the coating weight of the lubricant coating composition is too large, the lubricant transferred onto a sliding member may stick to the lubricant layer 6 due to cohesion, lowering the tape-transport properties.

In the magnetic recording medium 1, on another primary surface of the nonmagnetic support 2 that is not the primary surface on which the magnetic layer 3 is formed, a not shown support reinforcing layer and a not shown back coat layer can be formed.

It is preferred that the support reinforcing layer is containing a metal, such as Mg, Al, Si, Ti, V, Cr, Fe, Co, Ni, Cu, Zn, Ge, Zr, Nb, Mo, or W, or an alloy or oxide of these metals. As a method for forming the support reinforcing layer, a deposition process, such as a vapor deposition process, a sputtering process, or an ion plating process, can be used. It is preferred that the support reinforcing layer has a thickness of 20 to 500 nm.

The back coat layer is formed by applying to the nonmagnetic support 2 a back coat coating composition obtained by mixing and dispersing a powder component and a binder in an organic solvent. As examples of powder components, there can be mentioned carbon black for imparting electrically conductive properties and inorganic powder added for controlling the surface roughness and improving the robustness.

As carbon black to be incorporated into the back coat layer, it is preferred to use two types of carbon black having different average particle diameters, specifically, fine particle-form carbon black having an average particle diameter of 10 to 20 nm and coarse particle-form carbon black having an average particle diameter of 230 to 300 nm.

When the fine particle-form carbon black is incorporated into the back coat layer, the surface electrical resistance of the back coat layer is reduced, lowering the light transmittance. There are a number of magnetic recording medium recording and replaying apparatuses which utilize the light transmittance of a tape in signals for operation. In these apparatuses, the use of fine particle-form carbon black in the back coat layer is especially effective. In addition, the fine particle-form carbon black has superior retention force for lubricant, and therefore, when a lubricant is incorporated into the back coat layer, the fine particle-form carbon black lowers the coefficient of friction.

When the coarse particle-form carbon black is incorporated into the back coat layer, fine protrusions are formed on the surface of the back coat layer, so that the contact area between the surface of the back coat layer and a sliding member is reduced to lower the coefficient of friction. In other words, the coarse particle-form carbon black functions as a solid lubricant, but it is likely to be removed from the back coat layer during sliding of the tape in a severe traveling system, so that the error rate may be increased.

When two types of carbon black having different average particle diameters are incorporated into the back coat layer, the (fine particle-form carbon black): (coarse particle-form carbon black) ratio (weight ratio) is preferably 98:2 to 75:25, more preferably 95:5 to 85:15. Further, the amount of the carbon black (or the total weight of the fine particle-form carbon black and the coarse particle-form carbon black) incorporated into the back coat layer is preferably 30 to 80 parts by weight, more preferably 45 to 65 parts by weight, relative to 100 parts by weight of the below-mentioned binder.

As fine particle-form carbon black, specifically, RAVEN 2000B (18 nm) and RAVEN 1500B (17 nm), manufactured and sold by Columbia Carbon Corporation; BP 800 (17 nm), manufactured and sold by Cabot Specialty Chemicals Inc.; PRINNTEX 90 (14 nm), PRINTEX 95 (15 nm), PRINTEX 85 (16 nm), and PRINTEX 75 (17 nm), manufactured and sold by Degussa AG; and #3950 (16 nm), manufactured and sold by Mitsubishi Chemical Industries Ltd., can be used.

As specific commercially available products of coarse particle-form carbon black, thermal black (270 nm), manufactured and sold by Kern Culp Corporation, and RAVEN MTP (275 nm), manufactured and sold by Columbia Carbon Corporation, can be used.

On the other hand, as the inorganic powder to be incorporated into the back coat layer, it is preferred to use calcium carbonate or inorganic powder having a Mohs hardness of 5 to 9. When the inorganic powder having a Mohs hardness of 5 to 9 is incorporated into the back coat layer, together with, for example, calcium carbonate or the above-mentioned carbon black, their filler effect makes the strength of the back coat layer high so that the layer is difficult to deteriorate during repeated sliding.

When the inorganic powder having a Mohs hardness of 5 to 9 is incorporated into the back coat layer, the surface of the back coat layer has an appropriate abrasion force, lowering the amount of the deposit onto, e.g., a tape guide pole. Especially when the inorganic powder and calcium carbonate are used in combination in the back coat layer, the magnetic recording medium 1 is improved in sliding properties against a guide pole having a surface roughened, thus stabilizing the coefficient of friction of the back coat layer.

The inorganic powder having a Mohs hardness of 5 to 9 incorporated into the back coat layer preferably has an average particle diameter of 80 to 250 nm, more preferably 100 to 210 nm. The amount of the inorganic powder having a Mohs hardness of 5 to 9 incorporated into the back coat layer is preferably 3 to 30 parts by weight, more preferably 3 to 20 parts by weight, relative to 100 parts by weight of carbon black.

As the inorganic powder having a Mohs hardness of 5 to 9 to be incorporated into the back coat layer, for example, α-iron oxide, α-alumina, and chromium oxide can be used. Of these, it is preferred to use α-iron oxide or α-alumina. These inorganic powder having a Mohs hardness of 5 to 9 may be individually or in combination.

As examples of binders used in the back coat layer, there can be mentioned thermoplastic resins, thermosetting resins, reactive resins, and mixtures thereof.

As a thermoplastic resin, a polymer or a copolymer comprising, as a constitutional unit, vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal, and vinyl ether can be used. As a copolymer, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, vinylidene chloride-acrylonitrile copolymers, butadiene-acrylonitrile copolymers, styrene-butadiene copolymers, and chlorovinyl ether-acrylate copolymers can be used. In addition, polyamide resins; fibrous resins, such as cellulose acetate butyrate, cellulose diacetate, cellulose propionate, and nitrocellulose; polyvinyl fluoride; polyester resins; polyurethane resins; and various rubber resins can be used.

As a thermosetting resin or a reactive resin, for example, phenolic resins, epoxy resins, polyurethane setting resins, urea resins, melamine resins, alkyd resins, acrylic reactive resins, formaldehyde resins, silicone resins, epoxy-polyamide resins, mixtures of a polyester resin and a polyisocyanate prepolymer, mixtures of polyester polyol and polyisocyanate, and mixtures of polyurethane and polyisocyanate can be used.

As an organic solvent for the back coat coating composition, ketone solvents, such as acetone, methyl ethyl ketone, methyl isobutyl ketone, and cyclohexanone; ester solvents, such as methyl acetate, ethyl acetate, butyl acetate, ethyl lactate, and glycol acetate monoethyl ether; glycol ether solvents, such as glycol dimethyl ether, glycol monoethyl ether, and dioxane; aromatic hydrocarbon solvents, such as benzene, toluene, and xylene; aliphatic hydrocarbon solvents, such as hexane and heptane; and hydrocarbon chloride solvents, such as methylene chloride, ethylene chloride, carbon tetrachloride, chloroform, ethylene chlorohydrin, and dichlorobenzene can be used.

A lubricant can be further used in the back coat layer. In this case, a method in which a lubricant is incorporated into the back coat layer or a method in which a lubricant is retained on the back coat layer can be employed. As the lubricant, any lubricants conventionally known, such as fatty acid, fatty acid ester, fatty acid amide, metal soaps, aliphatic alcohol, and silicone lubricants, can be used.

The magnetic recording medium 1 having the above-described construction is prepared as follows.

First, on one primary surface of the nonmagnetic support 2, a magnetic metal thin film is formed as a magnetic layer 3 by, for example, a vacuum thin film forming technique, such as a vacuum deposition process, an ion plating process, or a sputtering process. Then, a protecting film 4 is formed on the magnetic layer 3 by, for example, a PVD process, such as a sputtering process, or a CVD process. Then, a coating composition comprising a lubricant auxiliary comprising an aromatic alcohol is applied to the protecting film 4 to form a lubricant auxiliary layer 5. Subsequently, a lubricant coating composition comprising a compound represented by structural formula (1) is applied to the lubricant auxiliary layer 5 to form a lubricant layer 6, thus obtaining a magnetic recording medium 1. If desired, a back coat layer may be formed.

Further, methods for forming the individual layers will be described in detail.

First, a method for forming a magnetic metal thin film constituting the magnetic layer 3 is described below. When forming the magnetic layer 3 by a vacuum deposition process, a ferromagnetic metal material is evaporated in vacuum at $1\times10^{-6}$ to $1\times10^{-2}$ Pa by resistance heating, high-frequency heating, or electron beam heating, and the metal (ferromagnetic metal material) evaporated is deposited on the nonmagnetic support 2. In the vacuum deposition process, for obtaining a magnetic layer having a high coercive force, an oblique-angle vapor deposition process is generally employed in which the ferromagnetic metal material evaporated is deposited at an angle onto the nonmagnetic support 2. Further, for obtaining a magnetic layer having a higher coercive force, the vacuum deposition may be conducted in an oxygen gas atmosphere.

On the other hand, when forming the magnetic layer 3 by an ion plating process which is one of the vacuum deposition processes, direct current (DC) glow discharge or radio frequency (RF) glow discharge is caused in an inert gas atmosphere at $1\times10^{-2}$ to $1\times10^{-1}$ Pa and the ferromagnetic metal material is evaporated during the discharge, so that the metal (ferromagnetic metal material) evaporated is deposited onto the nonmagnetic support 2.

When forming the magnetic layer 3 by a sputtering process, glow discharge is caused in an atmosphere comprised mainly of argon gas at 0.1 to 10 Pa, and the resultant argon gas ions attack the target surface and take out atoms in the target surface, so that the atoms are deposited on the nonmagnetic support 2. Specific examples of sputtering processes include a DC diode sputtering process, a DC triode sputtering process, an RF sputtering process, and a magnetron sputtering process utilizing magnetron discharge.

Next, a method for forming the protecting film 4 is described below. When forming the protecting film 4 by a CVD process, a hydrocarbon gas or a mixed gas of a hydrocarbon gas and an inert gas is introduced into a bell jar, and discharge is caused in the bell jar in a state such that the pressure is maintained at about 10 to 100 Pa to make hydrocarbon gas plasma, thus forming a protecting film 4 on the magnetic layer 3. As a discharge system, any of an external electrode system and an internal electrode system may be used, and the discharge frequency can be experimentally determined. When a voltage of 0 to −3 kV is applied to an electrode disposed on the surface of the nonmagnetic support 2 on which the magnetic layer 3 is formed, the protecting film 4 can be improved in hardness and adhesion properties.

As a hydrocarbon gas constituting the protecting film 4, methane, ethane, propane, butane, pentane, hexane, heptane, octane, ethylene, acetylene, propene, butene, pentene, or benzene can be used.

Next, a method for forming the lubricant auxiliary layer 5 is described below. A lubricant auxiliary comprising at least one aromatic alcohol is dissolved in a solvent to prepare a lubricant auxiliary coating composition, and the lubricant auxiliary coating composition is applied to the protecting film 4 to form a lubricant auxiliary layer 5. As a solvent used for preparing the lubricant auxiliary coating composition, an alcohol solvent may be used.

Next, a method for forming the lubricant layer 6 is described below. A lubricant comprising at least one compound represented by structural formula (1) is dissolved in a solvent to prepare a lubricant coating composition, and the lubricant coating composition is applied to the lubricant auxiliary layer 5 to form a lubricant layer 6. As a solvent used for preparing the lubricant coating composition, either a fluorine solvent or a hydrocarbon solvent, such as toluene or acetone, can be used.

Like a conventional fluorine-containing lubricant, the compound represented by structural formula (1) has a fluorine atom in its molecule. However, the conventional fluorine-containing lubricant is soluble only in a fluorine solvent, whereas the compound having the structure of formula (1) is soluble not only in a fluorine solvent but also in a hydrocarbon solvent, such as toluene or acetone. In other words, when forming the lubricant layer 6 comprising the compound having the structure of formula (1), as a solvent for the lubricant coating composition, there can be used a hydrocarbon solvent which rarely adversely affects the environment, as compared to the fluorine solvent.

As mentioned above, the magnetic recording medium 1 in the present embodiment has very superior lubricating properties. In addition, by virtue of having the lubricant layer 6 comprising a lubricant which prevents the generation of powder debris and the lubricant auxiliary layer 5 which promotes recovery of the lubricant film, the magnetic recording medium 1 has advantages not only in that it exhibits superior tape-transport properties and superior robustness under any conditions for use, but also in that it prevents the head from wearing off and it is prevented from suffering deterioration of the magnetic properties.

Second Embodiment

Figure 2:
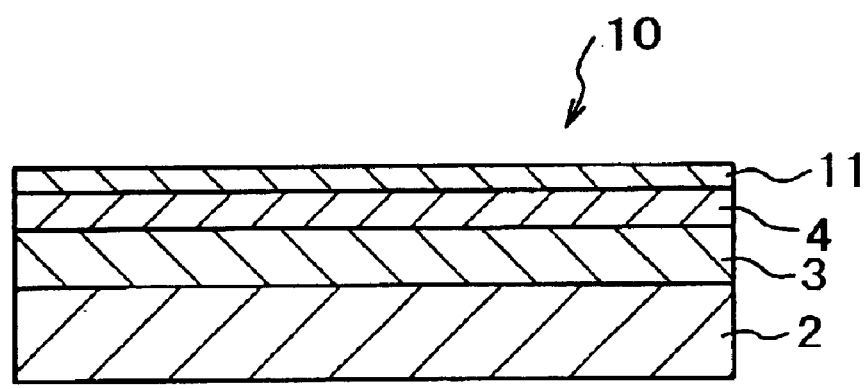
FIG. 2 is a diagrammatic cross-sectional view of a magnetic recording medium according to the second embodiment of the present invention.

FIG. 2 shows a magnetic recording medium 10 according to the second embodiment of the present invention. In FIG. 1 and FIG. 2, like parts or portions are indicated by like reference numerals, and the overlapping descriptions are omitted.

In FIG. 2, a magnetic metal thin film containing a ferromagnetic metal material is formed as a magnetic layer 3 on one primary surface of a nonmagnetic support 2, a protecting film 4 is formed on the magnetic layer 3, and a lubricant layer 11 is formed as the uppermost layer on the protecting film 4. That is, in the first embodiment, the lubricant auxiliary layer 5 and the lubricant layer 6 are formed on the protecting film 4, whereas, in the present embodiment, the lubricant layer 11 is formed on the protecting film 4.

In the present embodiment, the magnetic layer 3 and the protecting film 4 are formed in accordance with the same procedure as in the first embodiment, and therefore an explanation is made only on the formation of the lubricant layer 11. The lubricant layer 11 is formed by applying to the protecting film 4 a lubricant coating composition obtained by dissolving a lubricant auxiliary comprising an aromatic alcohol and a lubricant comprising a compound represented by structural formula (1) in a solvent. The lubricant auxiliary and lubricant used in the present embodiment are the same as those used in the first embodiment, and the lubricant comprising a compound represented by structural formula (1) not only maintains the lubricating effect over a long term but also prevents the generation of powder debris. As a solvent, an alcohol solvent is used.

The amount of the lubricant auxiliary in the lubricant layer 11 is desirably 5 to 120 mg per 1 $m^2$, more preferably 10 to 50 mg per 1 $m^2$. When the amount of the lubricant auxiliary is less than 5 mg per 1 $m^2$, the lubricant auxiliary cannot satisfactorily recover the lubricant film, so that the still robustness in a low-temperature environment may be unsatisfactory. On the other hand, when the amount of the lubricant auxiliary is more than 120 mg per 1 $m^2$, the lubricant auxiliary may inhibit the lubricant from properly functioning.

The coating weight of the lubricant coating composition is preferably 5 to 500 mg/$m^2$, more preferably 10 to 150 mg/$m^2$. When the coating weight of the lubricant coating composition is too small, the effects of lowering the coefficient of friction and improving the wear resistance and the robustness may not be satisfactorily obtained. On the other hand, when the coating weight of the lubricant coating composition is too large, the lubricant transferred onto a sliding member may stick to the lubricant layer 11 due to cohesion, lowering the tape-transport properties.

The lubricant layer 11 may include a compound containing an aromatic alcohol and a compound represented by structural formula (1) as well as a conventionally known lubricant in combination.

Like in the magnetic recording medium 1 in the first embodiment, in the magnetic recording medium 10, on another primary surface of the nonmagnetic support 2 that is not the primary surface on which the magnetic layer 3 is formed, a not shown support reinforcing layer and a not shown back coat layer can be formed.

The magnetic recording medium 10 having the above-described construction is prepared as follows.

First, on one primary surface of the nonmagnetic support 2, a magnetic metal thin film is formed as a magnetic layer 3 by, for example, a vacuum thin film forming technique, such as a vacuum deposition process, an ion plating process, or a sputtering process. Then, a protecting film 4 is formed on the magnetic layer 3 by, for example, a PVD process, such as a sputtering process, or a CVD process. Then, a lubricant coating composition comprising a lubricant auxiliary comprising an aromatic alcohol and a compound represented by structural formula (1) is applied to the protecting film 4 to form a lubricant layer 11, thus obtaining a magnetic recording medium 10. If desired, a back coat layer may be formed.

As mentioned above, the magnetic recording medium 10 in the present embodiment has very superior lubricating properties. In addition, by virtue of having the lubricant layer 11 comprising a lubricant which prevents the generation of powder debris and a lubricant auxiliary which lowers the density of the lubricant film, the magnetic recording medium 10 has advantages not only in that it exhibits superior tape-transport properties and superior robustness under any conditions for use, but also in that it prevents the head from wearing off and it is prevented from suffering deterioration of the magnetic properties.

EXAMPLES

Hereinbelow, the present invention will be described in more detail with reference to the following Examples.

Synthesis of Lubricant

First, as a lubricant, $C_9H_{19}CH(C_7H_{15})CH_2CH(COOC_{10}H_{20}C_8F_{17})CH_2COOC_{10}H_{20}C_8F_{17}$ was synthesized as follows.

Specifically, 15.6 g of 9-decene-1-ol $\{CH_2=CH(CH_2)_8OH\}$ and 54.6 g of perfluorooctyl iodide $\{F(CF_2)_8I\}$ were placed in a flask and nitrogen gas was passed through the resultant mixture in the flask, and then 0.05 g of 2,2'-azobis-isobutyronitrile (AIBN) was added to the mixture and heated under reflux to effect a reaction for 8 hours. After completion of the reaction, the unreacted raw materials were distilled off by vacuum evaporation to obtain 56 g of $F(CF_2)_8CH_2CHI(CH_2)_8OH$ as a residue.

Then, 56 g of $F(CF_2)_8CH_2CHI(CH_2)_8OH$ obtained as a residue was dissolved in 400 cc of ethanol, and 40 cc of concentrated hydrochloric acid was added to the resultant solution and then heated. Then, 6 g of zinc powder was added to the resultant mixture bit by bit and heated under reflux for 2 hours. Then, 20 cc of concentrated sulfuric acid was added to the mixture and heated under reflux to effect a reaction for one hour. After completion of the reaction, the resultant reaction mixture was filtered before the mixture was cooled, and the resultant filtrate was concentrated. Then, 200 cc of a 10% aqueous solution of sodium hydroxide was added to the filtrate concentrated and stirred to permit precipitate to deposit. Then, the precipitate was taken by filtration and dried to obtain 37 g of $F(CF_2)_8(CH_2)_{10}OH$.

Then, 37 g of $F(CF_2)_8(CH_2)_{10}OH$ and 15 g of isooctadecylsuccinic anhydride were dissolved in 400 cc of toluene, and concentrated sulfuric acid in such an amount that it served as a catalyst was added to the resultant solution and heated under reflux to effect a reaction for 3 hours. After cooling, the resultant reaction mixture was washed with water, and magnesium sulfate was added to the washed mixture to dry the mixture, followed by concentration. The unreacted raw materials were removed by column chromatography (silica gel/toluene), and then the eluent was changed to ethyl acetate to obtain a fraction containing a desired product. Finally, an ethyl acetate solution of the obtained fraction was concentrated to obtain 25 g of $C_8H_{17}CH(CH_2COOH)COOCH_2CH=CHC_6F_{13}$.

In addition to the above compound, five types of compounds were synthesized in accordance with the same method. The six types of compounds synthesized are shown in Table 1 below as compounds 1 to 6. The compounds 1 to 6 individually correspond to the lubricant represented by structural formula (1).

TABLE 1

| | Structural formula |
|---|---|
| Compound 1 | $C_8H_{17}CH$ $(CH_2COOH)$ $COOCH_2CH=CHC_6F_{13}$ |
| Compound 2 | $C_{12}H_{15}CH$ $[COOC_6H_{12}C_4F_8CF$ $(CF_3)_2]$ $CH_2COOC_6H_{12}C_4F_8CF$ $(CF$ |
| Compound 3 | $C_8H_{17}CH=C_7H_{14}CH$ $(COOH)$ $CH_2COOC_2H_4C_8F_{17}$ |
| Compound 4 | $C_{18}H_{37}CH$ $(COOH)$ $CH_2COOC_2H_4C_8F_{17}$ |
| Compound 5 | $C_9H_{19}CH$ $(C_7H_{15})$ $CH_2CH$ $(COOC_{10}H_{20}C_8F_{17})$ $CH_2COOC_{10}H_{20}C_8F_1$ |
| Compound 6 | $C_{12}H_{15}CH$ $(COOH)$ $CH_2COOCH_2CF_2$ $(CF_2O)_m(CF_2CF_2O)_nCF_3$ |

Further, as lubricants other than the compound represented by structural formula (1), three types of compounds, i.e., compounds 7 to 9 shown in Table 2 below were synthesized. Characters m and n seen in Table 2 individually represent an integer of 1 or more.

TABLE 2

| | Structural formula |
|---|---|
| Compound 7 | $C_{40}H_{81}CH$ $(COOH)$ $CH_2COOC_{20}H_{40}C_{18}F_{37}$ |
| Compound 8 | $C_4H_6CH$ $(COOH)$ $CH_2COOCH_2C_4F_9$ |
| Compound 9 | $HOCH_2CF_2$ $(CF_2CF_2O)_m(CF_2CF_2CF_2O)_nCF_2CCH_2OH$ (average molecular weight: 2,000) |

In addition, as lubricant auxiliaries, compounds 10 to 14 shown in Table 3 below were prepared.

TABLE 3

| Compound 10 | Phenol |
| Compound 11 | Catechol |
| Compound 12 | 2,3-Naphthalenediol |
| Compound 13 | 1,4,5-Naphthalenetriol |
| Compound 14 | 9-Anthracenemethanol |

Example 1

Next, with respect to the first embodiment of the present invention, using the lubricants and lubricant auxiliaries shown in Tables 1 to 3, magnetic tapes were prepared and evaluated as follows.

(Preparation of Sample Tape)

Experimental Example 1

First, Co was deposited by an oblique-angle deposition process on a film-form nonmagnetic support having a thickness of 5.0 $\mu$m containing polyethylene naphthalate to form a magnetic metal thin film having a thickness of 80 nm as a magnetic layer. Then, using an electrode and the resultant nonmagnetic support having thereon the magnetic thin film as a counter electrode, a direct voltage of −1.2 kV was applied to the support having the magnetic thin film to cause discharge by radio frequency plasma using a mixed gas of ethylene and argon, thus forming a protecting film having a thickness of about 15 nm containing carbon on the magnetic metal thin film.

Then, a back coat layer having a thickness of 0.5 $\mu$m containing carbon black and a polyurethane resin was formed on another surface of the nonmagnetic support that is not the surface on which the magnetic metal thin film was formed.

Then, a compound 10 shown in Table 3 was dissolved as a lubricant auxiliary in ethanol to prepare a lubricant auxiliary coating composition, and the coating composition was uniformly applied to the protecting film so that the coating weight became 50 mg/m$^2$ to form a lubricant auxiliary layer. Then, a compound 1 shown in Table 1 was dissolved as a lubricant in toluene to prepare a lubricant coating composition, and the lubricant coating composition was uniformly applied to the lubricant auxiliary layer so that the coating weight became 30 mg/m$^2$ to form a lubricant layer. Finally, the resultant magnetic recording medium was cut into a 6.35 mm-width tape to obtain a sample tape in Experimental Example 1.

Experimental Examples 2 to 9

Substantially the same procedure as in Experimental Example 1 was individually repeated except that the lubricant auxiliaries and lubricants shown in Table 4 were used individually in combination to prepare sample tapes in Experimental Examples 2 to 9.

TABLE 4

| | Lubricant auxiliary | | Lubricant | |
|---|---|---|---|---|
| | Compound | Coating weight (mg/m$^2$) | Compound | Coating weight (mg/m$^2$) |
| Ex. Exp. 1 | Compound 10 | 50 | Compound 1 | 30 |
| Ex. Exp. 2 | Compound 10 | 40 | Compound 3 | 50 |
| Ex. Exp. 3 | Compound 11 | 50 | Compound 2 | 40 |
| Ex. Exp. 4 | Compound 11 | 40 | Compound 6 | 50 |
| Ex. Exp. 5 | Compound 11 | 30 | Compound 1 | 60 |
| Ex. Exp. 6 | Compound 12 | 40 | Compound 3 | 50 |
| Ex. Exp. 7 | Compound 12 | 30 | Compound 4 | 40 |
| Ex. Exp. 8 | Compound 13 | 30 | Compound 4 | 30 |
| Ex. Exp. 9 | Compound 13 | 50 | Compound 2 | 70 |

Experimental Examples 10 to 17

Substantially the same procedure as in Experimental Example 1 was individually repeated except that the lubricant auxiliaries and lubricants shown in Table 5 were used individually in combination to prepare sample tapes in Experimental Examples 10 to 17. It is noted that, in Experimental Example 13, the compound 9 was insoluble in toluene, and hence a lubricant coating composition was prepared using Fluorinert (trademark)(manufactured and sold by 3M) which is a fluorine solvent.

TABLE 5

|  | Lubricant auxiliary | | Lubricant | |
|---|---|---|---|---|
|  | Compound | Coating weight (mg/m²) | Compound | Coating weight (mg/m²) |
| Ex. Exp. 10 | Non | 0 | Compound 5 | 50 |
| Ex. Exp. 11 | Compound 10 | 30 | Compound 7 | 50 |
| Ex. Exp. 12 | Compound 11 | 30 | Compound 8 | 50 |
| Ex. Exp. 13 | Compound 12 | 30 | Compound 9 | 50 |
| Ex. Exp. 14 | Compound 14 | 40 | Compound 5 | 50 |
| Ex. Exp. 15 | Compound 10 | 160 | Compound 1 | 0.3 |
| Ex. Exp. 16 | Compound 13 | 5 | Compound 4 | 550 |
| Ex. Exp. 17 | Compound 11 | 30 | Non | 0 |

(Evaluation of Sample Tape)

With respect to each of the sample tapes prepared in Experimental Examples 1 to 17, the below-described various measurements were conducted immediately after completion of the preparation of each sample tape to evaluate the tape-transport properties and the still robustness.

The tape-transport properties were evaluated as follows. In a thermostatic chamber controlled to create therein an environment under conditions at a temperature of 25° C. at a humidity of 60%, each sample tape was subjected to 100-cycle tape-run while being rubbed against a stainless steel guide pin, and a coefficient of friction after the 100th-cycle tape-run was measured.

The still robustness was evaluated as follows. In a thermostatic chamber controlled at a temperature of −5° C., still replay was conducted with respect to each sample tape using a commercially available digital video camcorder (manufactured and sold by Sony Corporation; model: VX-1000), and a period of time until the replay output was lowered by 3 dB from the initial replay output was measured.

The robustness was further evaluated as follows. First, in a thermostatic chamber controlled at a temperature of −5° C., using a recording and replaying apparatus obtained by modifying a commercially available digital video camcorder (manufactured and sold by Sony Corporation; model: VX-1000) so that an MR head was usable in the apparatus, replaying for 30 minutes was repeated 50 times with respect to each sample tape. After the repeated tape-run, the resultant MR head was observed through an optical microscope to evaluate the degree of dust deposition on the MR head and the depth of wear of the MR head.

The degree of dust deposition on the MR head was evaluated in accordance with the following four criteria: a sample tape which caused almost no dust deposition on the MR head was rated symbol ⊚; a sample tape which caused dust deposition on 50% or less of the head area and did not adversely affect the output was rated symbol ○; a sample tape which caused dust deposition on 50% or less of the head area and adversely affected the output was rated symbol Δ; and a sample tape which caused dust deposition on more than 50% of the head area or caused clogging during tape-run was rated symbol X.

In addition, as the depth of wear of an MR head, a difference in the height between the initial MR head and the MR head after the 50-time repetition of the replaying for 30 minutes was measured.

The results of the measurements are shown in Tables 6 and 7.

TABLE 6

|  | Coefficient of friction | Still robustness (min) | Depth of wear of MR head (nm) | Degree of dust deposition |
|---|---|---|---|---|
| Ex. Exp. 1 | 0.28 | >60 | 53 | ⊚ |
| Ex. Exp. 2 | 0.24 | >60 | 69 | ⊚ |
| Ex. Exp. 3 | 0.24 | >60 | 48 | ⊚ |
| Ex. Exp. 4 | 0.25 | >60 | 52 | ⊚ |
| Ex. Exp. 5 | 0.26 | >60 | 47 | ⊚ |
| Ex. Exp. 6 | 0.23 | >60 | 53 | ⊚ |
| Ex. Exp. 7 | 0.21 | >60 | 46 | ⊚ |
| Ex. Exp. 8 | 0.23 | >60 | 48 | ⊚ |
| Ex. Exp. 9 | 0.24 | >60 | 66 | ⊚ |

TABLE 7

|  | Coefficient of friction | Still robustness (min) | Depth of wear of MR head (nm) | Degree of dust deposition |
|---|---|---|---|---|
| Ex. Exp. 10 | 0.22 | 17 | 46 | ⊚ |
| Ex. Exp. 11 | A lubricant layer could not be formed. | | | |
| Ex. Exp. 12 | 0.72 | 13 | 192 | X |
| Ex. Exp. 13 | 0.77 | 6 | See Note 1). | |
| Ex. Exp. 14 | 0.22 | 16 | 46 | ⊚ |
| Ex. Exp. 15 | >1.0 | 2 | See Note 2). | |
| Ex. Exp. 16 | >1.0 | 5 | See Note 1). | |
| Ex. Exp. 17 | >1.0 | 1 | See Note 3). | |

Note 1): 50-Time tape-run could not be conducted due to increase in friction.
Note 2): 50-Time tape-run could not be conducted due to increase in friction.
Note 3): 50-Time tape-run could not be conducted due to increase in friction.

As can be seen from Tables 6 and 7, in the sample tapes in Experimental Examples 1 to 9 in which a lubricant auxiliary layer comprising an aromatic alcohol and a lubricant layer comprising a compound represented by structural formula (1) are formed on the protecting film, very superior results are obtained such that the tapes have a low coefficient of friction and superior shuttle robustness, and prevent the generation of powder debris and suppress wearing off of the head.

By contrast, in the sample tapes in Experimental Examples 10 to 17 in which a lubricant auxiliary layer comprising an aromatic alcohol is not used, a lubricant comprising a compound other than the compound represented by structural formula (1) is used, or their amounts are not appropriate, it is found that the coefficient of friction or the shuttle robustness deteriorates under various conditions for use, and the generation of powder debris is not prevented and the depth of wear of the MR head is large, and thus superior results are not obtained.

Further specifically, in Experimental Example 10, the sample tape has no lubricant auxiliary layer, and hence superior still robustness could not be obtained. In Experimental Example 11, the compound 7 as a lubricant has an alkyl chain length larger than the appropriate length, and hence the lubricant is difficult to be dissolved in a solvent, so that a sample tape could not be prepared. In Experimental Example 12, the compound 8 as a lubricant has an alkyl chain length smaller than the appropriate length, and hence the resultant sample tape has too high a coefficient of friction, so that superior tape-transport properties could not be obtained. In Experimental Example 13, the lubricant does not have the structure represented by formula (1), and hence the resultant sample tape has too high a coefficient of friction, so that superior tape-transport properties could not be obtained. In Experimental Example 14, the lubricant auxiliary is not a phenol or a naphthol, and hence superior still robustness could not be obtained.

In addition, in the sample tapes in Experimental Examples 15 and 16 in which the amounts of the lubricant auxiliary and lubricant are not appropriate and the sample tape in Experimental Example 17 comprising no lubricant layer, it is found that superior results are not obtained under various conditions for use. Especially when the sample tapes in Experimental Examples 13 and 15 to 17 were individually used in an environment at −5° C., dust was deposited on a sliding member, such as a drum or a fixed guide, during shuttle tape-run to cause a sticking phenomenon such that the tape stuck to the sliding member, so that tape-run could not be continued.

From the above, it is apparent that, by virtue of having a layer comprising a phenol or a naphthol formed as a lubricant auxiliary layer on the protecting film and a lubricant layer comprising a compound represented by structural formula (1) formed as the uppermost layer on the lubricant auxiliary layer, the magnetic recording medium has advantages not only in that superior lubricating properties are maintained under any conditions for use and the generation of powder debris is prevented, but also in that the magnetic recording medium exhibits superior tape-transport properties and superior robustness and prevents the head from wearing off and it is prevented from suffering deterioration of the magnetic properties.

Example 2

With respect to the second embodiment of the present invention, using the lubricants and lubricant auxiliaries shown in Tables 1 to 3, magnetic tapes were prepared and evaluated as follows.

(Preparation of Sample Tape)

Experimental Example 20

First, Co was deposited by an oblique-angle deposition process on a film-form nonmagnetic support having a thickness of 5.0 μm containing polyethylene naphthalate to form a magnetic metal thin film having a thickness of 80 nm as a magnetic layer. Then, using an electrode and the resultant nonmagnetic support having thereon the magnetic thin film as a counter electrode, a direct voltage of −1.2 kV was applied to the support having the magnetic thin film to cause discharge by radio frequency plasma using a mixed gas of ethylene and argon, thus forming a protecting film having a thickness of about 15 nm containing carbon on the magnetic metal thin film.

Then, a back coat layer having a thickness of 0.5 μm containing carbon black and a polyurethane resin was formed on another surface of the nonmagnetic support that is not the surface on which the magnetic metal thin film was formed.

Then, a compound 10 shown in Table 3 as a lubricant auxiliary and a compound 1 shown in Table 1 as a lubricant were dissolved in ethanol to prepare a lubricant coating composition, and the coating composition was uniformly applied to the protecting film so that the coating weight of the compound 10 and the coating weight of the compound 1 became 50 mg/m² and 30 mg/m², respectively, to form a lubricant layer. Finally, the resultant magnetic recording medium was cut into a 6.35 mm-width tape to obtain a sample tape in Experimental Example 20.

Experimental Examples 21 to 28

Substantially the same procedure as in Experimental Example 20 was individually repeated except that the lubricant auxiliaries and lubricants shown in Table 8 were used individually in combination to prepare sample tapes in Experimental Examples 21 to 28.

TABLE 8

| | Lubricant auxiliary | | Lubricant Coating | |
|---|---|---|---|---|
| | Compound | Coating weight (mg/m²) | Compound | weight (mg/m²) |
| Ex. Exp. 20 | Compound 10 | 50 | Compound 1 | 30 |
| Ex. Exp. 21 | Compound 10 | 40 | Compound 3 | 50 |
| Ex. Exp. 22 | Compound 11 | 50 | Compound 2 | 40 |
| Ex. Exp. 23 | Compound 11 | 40 | Compound 6 | 50 |
| Ex. Exp. 24 | Compound 11 | 30 | Compound 1 | 60 |
| Ex. Exp. 25 | Compound 12 | 40 | Compound 3 | 50 |
| Ex. Exp. 26 | Compound 12 | 30 | Compound 4 | 40 |
| Ex. Exp. 27 | Compound 13 | 30 | Compound 4 | 30 |
| Ex. Exp. 28 | Compound 13 | 50 | Compound 2 | 70 |

Experimental Examples 29 to 36

Substantially the same procedure as in Experimental Example 20 was individually repeated except that the lubricant auxiliaries and lubricants shown in Table 9 were used individually in combination to prepare sample tapes in Experimental Examples 29 to 36.

TABLE 9

| | Lubricant auxiliary | | Lubricant Coating | |
|---|---|---|---|---|
| | Compound | Coating weight (mg/m²) | Compound | weight (mg/m²) |
| Ex. Exp. 29 | Non | 0 | Compound 5 | 50 |
| Ex. Exp. 30 | Compound 10 | 30 | Compound 7 | 50 |
| Ex. Exp. 31 | Compound 11 | 30 | Compound 8 | 50 |
| Ex. Exp. 32 | Compound 12 | 30 | Compound 9 | 50 |
| Ex. Exp. 33 | Compound 14 | 40 | Compound 5 | 50 |
| Ex. Exp. 34 | Compound 10 | 130 | Compound 1 | 0.3 |
| Ex. Exp. 35 | Compound 13 | 5 | Compound 4 | 550 |
| Ex. Exp. 36 | Compound 11 | 30 | Non | 0 |

(Evaluation of Sample Tape)

With respect to each of the sample tapes prepared in Experimental Examples 20 to 36, various measurements were conducted in the same manner as in Example 1 (Experimental Examples 1 to 17) immediately after completion of the preparation of each sample tape to evaluate the tape-transport properties and the still robustness. The results of the measurements are shown in Tables 10 and 11.

TABLE 10

| | Coefficient of friction | Still robustness (min) | Depth of wear of MR head (nm) | Degree of dust deposition |
|---|---|---|---|---|
| Ex. Exp. 20 | 0.29 | >60 | 56 | ⊚ |
| Ex. Exp. 21 | 0.25 | >60 | 69 | ⊚ |
| Ex. Exp. 22 | 0.26 | >60 | 52 | ⊚ |
| Ex. Exp. 23 | 0.26 | >60 | 55 | ⊚ |
| Ex. Exp. 24 | 0.28 | >60 | 48 | ⊚ |
| Ex. Exp. 25 | 0.25 | >60 | 55 | ⊚ |
| Ex. Exp. 26 | 0.24 | >60 | 49 | ⊚ |
| Ex. Exp. 27 | 0.24 | >60 | 53 | ⊚ |
| Ex. Exp. 28 | 0.25 | >60 | 69 | ⊚ |

TABLE 11

|  | Coefficient of friction | Still robustness (min) | Depth of wear of MR head (nm) | Degree of dust deposition |
|---|---|---|---|---|
| Ex. Exp. 29 | 0.22 | 17 | 46 | ⊚ |
| Ex. Exp. 30 | A lubricant layer could not be formed. | | | |
| Ex. Exp. 31 | 0.83 | 16 | 199 | X |
| Ex. Exp. 32 | A lubricant coating composition could not be prepared. | | | |
| Ex. Exp. 33 | 0.25 | 16 | 47 | ⊚ |
| Ex. Exp. 34 | >1.0 | 2 | | See Note 1). |
| Ex. Exp. 35 | >1.0 | 2 | | See Note 2). |
| Ex. Exp. 36 | >1.0 | 1 | | See Note 3). |

Note 1) 50-Time tape-run could not be conducted due to increase in friction.
Note 2) 50-Time tape-run could not be conducted due to increase in friction.
Note 3) 50-Time tape-run could not be conducted due to increase in friction.

As can be seen from Tables 10 and 11, in the sample tapes in Experimental Examples 20 to 28 in which a lubricant layer comprising an aromatic alcohol and a compound represented by structural formula (1) is formed on the protecting film, very superior results are obtained such that the tapes have a low coefficient of friction and superior shuttle robustness, and prevent the generation of powder debris and suppress wearing off of the head.

By contrast, in the sample tapes in Experimental Examples 29 to 36 in which an aromatic alcohol is not used, a lubricant comprising a compound other than the compound represented by structural formula (1) is used, or their amounts are not appropriate, it is found that the coefficient of friction or the shuttle robustness deteriorates under various conditions for use, and the generation of powder debris is not prevented and the depth of wear of the MR head is large, and thus superior results are not obtained.

Further specifically, in Experimental Example 29, the sample tape has no lubricant auxiliary, and hence superior still robustness could not be obtained. In Experimental Example 30, the compound 7 as a lubricant has an alkyl chain length larger than the appropriate length, and hence the lubricant is difficult to be dissolved in a solvent, so that a sample tape could not be prepared. In Experimental Example 31, the compound 8 as a lubricant has an alkyl chain length smaller than the appropriate length, and hence the resultant sample tape has too high a coefficient of friction, so that superior tape-transport properties could not be obtained. In Experimental Example 32, the lubricant was insoluble in ethanol, and hence a coating composition could not be prepared. In Experimental Example 33, the lubricant auxiliary is not a phenol or a naphthol, and hence superior still robustness could not be obtained.

In addition, in the sample tapes in Experimental Examples 34 and 35 in which the amounts of the lubricant auxiliary and lubricant are not appropriate, and the sample tape in Experimental Example 36 comprising no lubricant, it is found that superior results are not obtained under various conditions for use. Especially when the sample tapes in Experimental Examples 34 to 36 were individually used in an environment at −5° C., dust was deposited on a sliding member, such as a drum or a fixed guide, during shuttle tape-run to cause a sticking phenomenon such that the tape stuck to the sliding member, so that tape-run could not be continued.

From the above, it is apparent that, by virtue of having a lubricant layer comprising a lubricant auxiliary comprising a phenol or a naphthol and a compound represented by structural formula (1) formed as the uppermost layer on the protecting film, the magnetic recording medium has advantages not only in that superior lubricating properties are maintained under any conditions for use and the generation of powder debris is prevented, but also in that the magnetic recording medium exhibits superior tape-transport properties and superior robustness and prevents the head from wearing off and it is prevented from suffering deterioration of the magnetic properties.

What is claimed is:

1. A magnetic recording medium comprising a nonmagnetic support, a magnetic layer containing a ferromagnetic metal material, and a protecting film, wherein said magnetic layer and said protecting film are successively formed over said nonmagnetic support, wherein a lubricant auxiliary layer containing aromatic alcohol is formed over said protecting film;

wherein a lubricant layer comprising a compound represented by the following formula (1) is formed over said lubricant auxiliary layer:

$$R^1CH(COOR^2)CH_2COOR^3$$

wherein $R^1$ represents an aliphatic alkyl group, an aliphatic alkenyl group, or a hydrogen atom, and each of $R^2$ and $R^3$ independently represents a fluoroalkyl group, a fluoroalkenyl group, a fluoropolyether group, or a hydrogen atom provided that at least one of $R^2$ or $R^3$ is a fluoroalkyl group, a fluoroalkenyl group, or a fluoropolyether group;

wherein the amount of the aromatic alcohol in said lubricant auxiliary layer is 5 to 150 mg/m²;

and the amount of the lubricant comprising a compound represented by formula (1) in said lubricant layer is 5 to 500 mg/m².

2. A magnetic recording medium comprising a nonmagnetic support, a magnetic layer containing a ferromagnetic metal material, and a protecting film, wherein said magnetic layer and said protecting film are successively formed on said nonmagnetic support, wherein a lubricant layer comprising an aromatic alcohol and a compound represented by the following formula (1) is formed on said protecting film:

$$R^1CH(COOR^2)CH_2COOR^3$$

wherein $R^1$ represents an aliphatic alkyl group, an aliphatic alkenyl group, or a hydrogen atom, and each of $R^2$ and $R^3$ independently represents a fluoroalkyl group, a fluoroalkenyl group, a fluoropolyether group, or a hydrogen atom provided that at least one of $R^2$ or $R^3$ is a fluoroalkyl group, a fluoroalkenyl group, or a fluoropolyether group;

wherein the amount of the aromatic alcohol in said lubricant layer is 5 to 120 mg/m²;

and the amount of the lubricant comprising a compound represented by formula (1) in said lubricant layer is 5 to 500 mg/m².

* * * * *